March 26, 1940.  R. G. MOBARRY  2,195,184
LIGHT PROJECTING APPARATUS
Filed Nov. 30, 1938
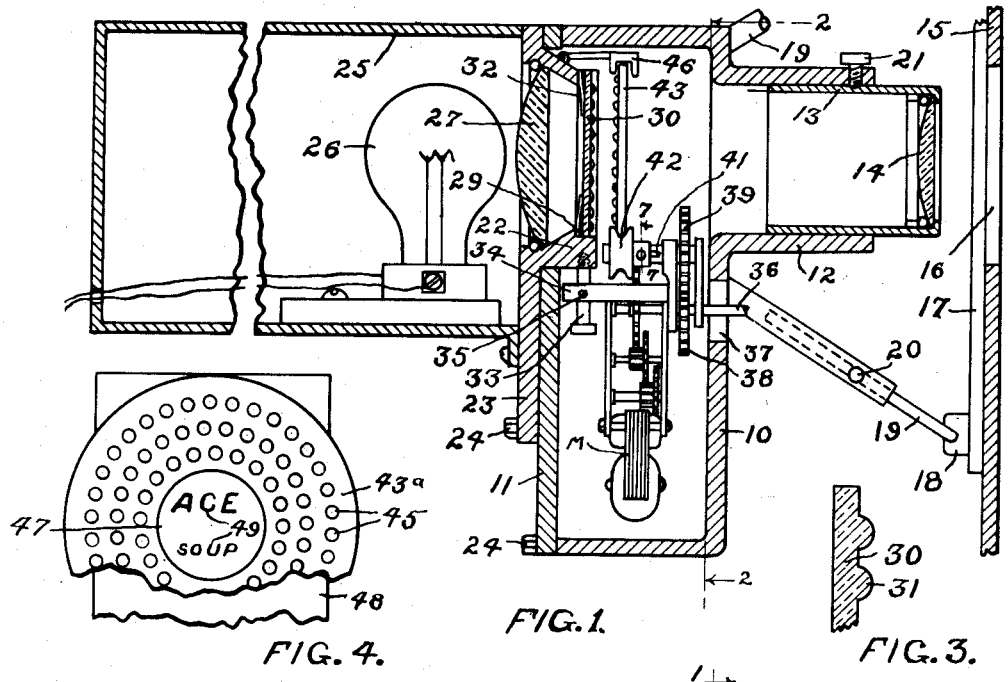
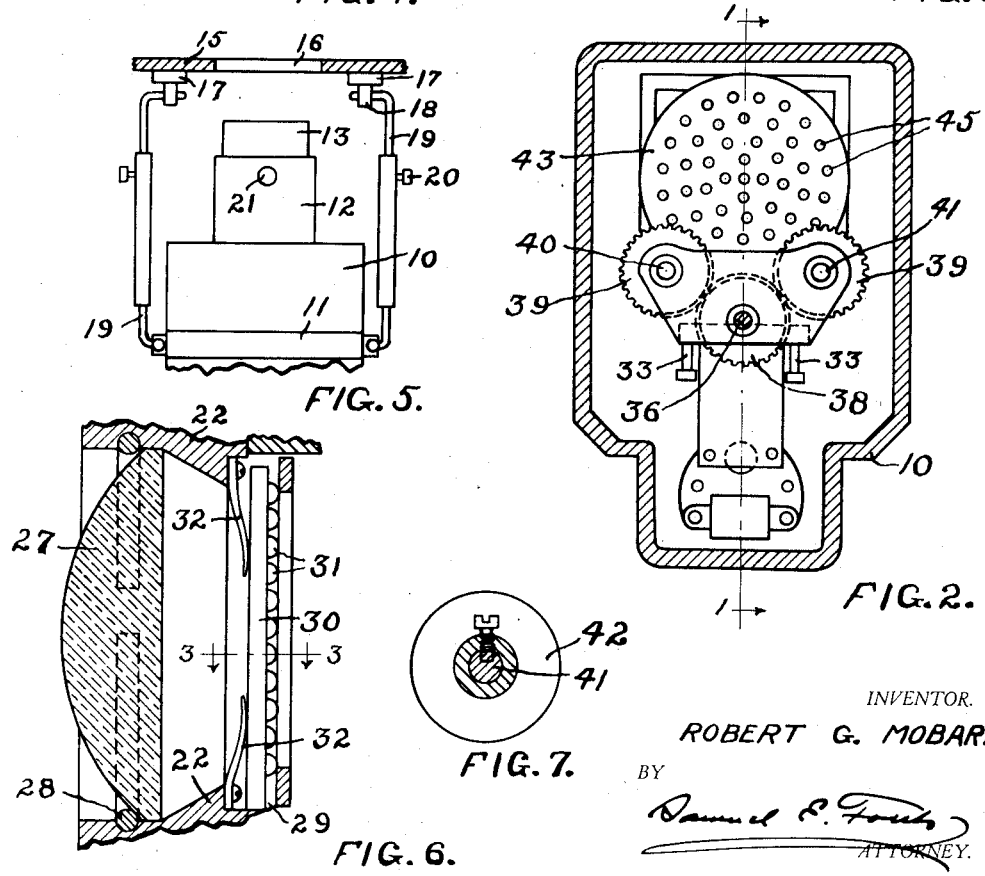
INVENTOR.
ROBERT G. MOBARRY
BY
ATTORNEY.

Patented Mar. 26, 1940

2,195,184

UNITED STATES PATENT OFFICE 2,195,184

LIGHT PROJECTING APPARATUS

Robert G. Mobarry, Bellflower, Calif., assignor of one-third to John Drew and James M. O'Connell, both of Los Angeles, Calif.

Application November 30, 1938, Serial No. 243,175

6 Claims. (Cl. 88—24)

This invention relates to apparatus for projecting light upon a screen or other surface and for giving the light so projected the effect of animation. I know that devices for the same general purpose have been proposed and that my invention involves pricipally details of construction. However, by the employment of these details, I have produced an apparatus of the character stated which is simpler and more rugged in construction, more easily operated and, generally, far more satisfactory than is any other apparatus for the purpose of which I am aware. Further, my invention embodies features of adjustment which I belive to be new and which I have found to be effective. In one form of my invention, the light is projected through a transparent or translucent plate bearing some design, as an advertisement, and means are provided for surrounding the image projected from said design with a field of seemingly floating luminous bodies, the same imparting the effect of animation, thus adding to the attractiveness of the projected image. Means are also provided for supporting the apparatus from a wall of the containing booth and for adjusting the same with respect to the said wall whereby the apparatus may be shifted to cause the projected light to fall on the screen in the exact position desired. These, and other features of the invention, will be set forth in detail in the following description of my preferred structure which is illustrated in the accompanying drawing.

Referring to said drawing, Fig. 1 is a longitudinal sectional view taken centrally through the apparatus, as on line 1—1 of Fig. 2; Fig. 2 is a transverse section on line 2—2 of Fig. 1; Fig. 3 is a sectional view taken through a portion of the rotatable animator plate, as on line 3—3 of Fig. 6; Fig. 4 is a view showing a portion of an animator plate of a modified form; Fig. 5 is a plan view of a part of the invention, showing the means for supporting the apparatus from a wall of the projecting booth; Fig. 6 is a sectional view showing, on an enlarged scale, a portion of the structure shown in Fig. 1, and Fig. 7 is a sectional view on line 7—7 of Fig. 1.

In the drawing, in which like reference characters designate like parts throughout the several views, 10 represents the main member of the projector casing. Its transverse shape is as best seen in Fig. 2. It is preferably a casting made of a light metal or alloy with relatively thin walls to reduce weight as much as is practicable. Its rear end is open, but is adapted to be closed by a plate 11, presently to be more particularly described. Its front end is provided with a tubular extension 12 within which a mounting 13 for a lens 14 is adapted to telescope. This main member may be supported in any suitable manner, but I prefer to attach it to the rear of the front wall 15 of the projecting booth so that the lens may face a window 16 in said wall. At the sides of said window I attach members 17, each of which has an eye piece 18 within which the hooked ends of opposed struts 19 are pivoted. There is a pair of these eyes and struts at each side of the window, and the struts of each pair converge inwardly to be pivoted at their inner ends to the respective sides of the plate 11. Each of the struts is made up of a pair of telescoping parts which are held against relative movement by a set-screw 20. As will be understood, when these set screws are loosened, the member 10 may be tilted or rocked into any desired position to cause the light projected through the lens 14 to fall on any desired part of the screen (not shown). When thus adjusted, the set-screws may be tightened to hold the struts against subsequent movement. The lens mounting 13 is adapted to be moved back and forth in the tubular extension 12 in focusing the light on the screen and to be held in position, when adjusted, by a set screw 21.

The closure plate 11 at the rear of the main casing member is provided with an aperture in axial alinement with the extension 12 and the lens 14 to receive a forwardly projecting tubular and conical boss 22 on the rear plate 23 of the casing. The member 10, the plate 11 and the rear plate 23 may be rigidly held together in any suitable way, as by machine-bolts 24. At the rear of the plate 23 is secured the housing 25 for a suitable source of light, as for a lamp-bulb 26. In front of the lamp is a condensing lens 27 which is confined within the conical aperture through the boss 22 by any sutiable means, as by a split resilient ring 28 which is adapted to be compressed and snapped into a groove in the inner surface of the boss 22, as best shown in Fig. 6. At its front end the boss is provided with a seat or way 29 to receive a glass or other transparent or translucent plate 30, one side of which is provided with integral knobs or bosses 31 forming lenses or prisms for refracting the light which passes through them. The seat or way is open at its top so that the plate may be easily inserted when the casing is opened, and the plate is resiliently held in position by springs 32 which are secured to the boss and press against the rear of the plate. Preferably, and as shown, the knobs 31 are on the front of the plate and they cover substantially the entire surface thereof. Plates having other arrangements of knobs can be substituted when and as desired.

Secured to the lower part of the forward end of the boss 22 is a pair of guides 33. As shown, these guides are headed bolts tapped into the boss to extend downwardly therefrom in parallel relation. They support a frame member 34 which is slidable thereon and is adapted to be fixed at any desired height by a pin or screw 35. This frame member supports a motor, which is represented generally by M. It is preferably an electric motor; and it may be of any suitable size and design. I make no claim to any particular motor construction or arrangement of gearing connected therewith, and deem it sufficient to state that this gearing drives a shaft 36 which preferably extends outside the casing through a slot 37 in the main casing member 10. If desired, adjuncts of various kinds may be driven from this shaft. Secured to this shaft within the casing is a gear 38 which meshes with and drives a pair of similar gears 39 on parallel shafts 40 and 41. On each of these latter shafts is adjustably secured a deeply-grooved roller 42. Resting upon these rollers with its perimetral edge within the grooves thereof is an animating disk 43 of glass or other transparent or translucent material, the same having a series of knobs or bosses 45 thereon arranged in any desired design. These knobs, like those of Fig. 3, are integral with the disk and they refract the light which passes through them. The disk 43 of Figs. 1 and 2 is flat and continuous. That is, it has no perforation or perforations, and all the light passes through the material of the disk. As the rollers 42 are rotated the animating disk is turned slowly. The knobs 45 serve as lenses or prisms and cause the light passing through them to be focussed more or less sharply upon the screen to give the effect of floating spots of light in a field of less intense light. This effect is very interesting and pleasing; and when this animating disk is used in combination with the refracting plate 30 of Fig. 3, the floating spots of light are made to scintillate, as when the concentrated rays which proceed from the knobs 31 are intercepted by the moving knobs on the animator plate. This scintillating effect is very striking and pleasing. The plate 30 and the animating disk 43 may be flat, as shown, or they may be dish or bowl-shaped as preferred. The disk may be held in its vertical position by any suitable means, as by a hook-like member 46 which is pivoted to and projected from the casing plate 23 or from the boss 22 thereon. The front end of this member has a channel or groove within which the disk is guided and held from tipping. When a flat animator disk is employed, the rollers 42 will be fixed to the splined shafts 40 and 41 in the position shown in Fig. 1. If a dish or bowl-shaped disk be employed the rollers will be shifted away from the refracting plate 30.

In Fig. 4 I have shown a slightly modified structure in which the animating disk 43ª has a central opening 47 in the axes of the lenses 14 and 27. Outside this opening, the disk is provided with the knobs 45, as in the disk of Fig. 2. When this annular disk 43ª is employed, the plate 30 is removed and a plate 48 is substituted in its stead. This latter plate bears some indicia which is to be projected on the screen. The indicia may be of any desired character, as the advertisement 49. It will be understood that when this set-up is employed, the advertisement will appear in a tranquil or steady field of light which is surrounded by a field of revolving spots of light.

I claim as my invention:

1. In a light-projecting apparatus, a casing which comprises a main member, an intermediate member and a rear member, said main member having a forwardly extending tubular projection and an open rear side opposite said projection, said intermediate member being a substantially flat vertical plate closing the said open side of the main member and having an aperture therethrough in axial alinement with the tubular projection on the main member, said rear member being a plate contacting with the rear side of the intermediate member about the aperture therein and having a hollow boss projecting into said aperture, a lantern housing attached to the rear side of said rear member, a source of light within said housing, a condensing lens supported within said hollow boss, a lens adjustably mounted within the tubular projection on the main member, the source of light and said lenses being in axial alinement, means connecting the said members of the casing rigidly but detachably together, and means for supporting the apparatus and for directing the light projected through said lenses.

2. The combination with the apparatus set forth in claim 1, of a booth containing said apparatus and having a window in one of its walls, a pair of members secured to said wall on opposite sides of the said window, a pair of struts pivoted to each of said members, the pivots of said struts being spaced apart and the pivots at the respective sides of the window being in vertical alinement, the struts of the pairs at the sides of the window converging outwardly from the window, pivotal connections between the outer ends of the struts and the casing of the projecting apparatus, and means for varying the lengths of said struts whereby the apparatus may be tilted to cause the light projected therefrom to be directed as desired through said window.

3. An apparatus as set forth in claim 1 in which the forward end of the boss on the rear member is provided with ways, and a light-transmitting plate mounted in said ways, said plate having a surface with a plurality of light-refracting elements thereon for refracting the light passing through the plate and the lenses.

4. In a light projecting apparatus, a casing which comprises a main member, an intermediate member and a rear member, said main member having a forwardly extending tubular projection and an open rear side opposite said projection, said intermediate member being a substantially flat vertical plate closing the said open side of the main member and having an aperture therethrough in axial alinement with the tubular projection on the main member, said rear member being a plate contacting with the rear side of the intermediate member about the aperture therein and having a hollow conical boss projecting into said aperture, a housing attached to the rear side of said rear member, a source of light within said housing, a condensing lens supported within said conical boss, a lens adjustably mounted within the tubular projection on the main member, the source of light and said lenses being in axial alinement, means connecting the said members of the casing rigidly but detachably together, ways formed in the forward end of the said conical boss, a light-transmitting plate mounted in said ways, said plate having a surface with a plurality of light refracting elements thereon for refracting the light passing through the plate and the lenses, an animating disk in front of the light-transmitting plate, and means within the casing for rotating said animating disk.

5. Light-projecting apparatus as set forth in claim 4 in which the hollow conical boss is provided with a pair of guides, and in which the means for rotating the animating disk comprises a motor adjustably mounted on said guides, a pair of shafts driven by said motor, and a roller for and on each of said shafts, each of said rollers having a peripheral groove in which the edge of the animating disk rests.

6. Light-projecting apparatus as set forth in claim 4 in which the hollow conical boss is provided with a pair of guides and in which the means for rotating the animating disk comprises an electric motor adjustably mounted on said guides, a pair of parallel shafts driven by said motor, a roller for and on each of said shafts, each of said rollers having a peripheral groove in which the edge of the animating disk rests and means for adjustably securing said rollers to their respective shafts, the adjustment of the motor on said guides permitting the rollers to be positioned vertically to accommodate animating disks of different diameters and the adjustment of the rollers on their shafts permitting the rollers to be positioned toward or from the light-transmitting plate.

ROBERT G. MOBARRY.